United States Patent [19]
Van Every et al.

[11] Patent Number: 5,861,585
[45] Date of Patent: Jan. 19, 1999

[54] AERACOUSTIC WIND TUNNEL TURNING VANES

[75] Inventors: David H. Van Every; Roy Fedoruk, both of Ontario, Canada

[73] Assignee: Aiolos Engineering Corporation, Canada

[21] Appl. No.: 944,102

[22] Filed: Sep. 30, 1997

[51] Int. Cl.$^6$ .................................................. E04F 17/04
[52] U.S. Cl. .......................................................... 181/224
[58] Field of Search .................................... 181/229, 224, 181/217, 218, 219, 214, 264, 225

[56] References Cited

U.S. PATENT DOCUMENTS

| | | | |
|---|---|---|---|
| 3,739,872 | 6/1973 | McNair .................................... | 181/224 |
| 4,330,047 | 5/1982 | Ruspa et al. ............................. | 181/224 |
| 5,756,944 | 5/1998 | Battig et al. ............................. | 181/229 |

*Primary Examiner*—Khanh Dang
*Attorney, Agent, or Firm*—Nixon & Vanderhye P.C.

[57] ABSTRACT

The invention provides an elongate turning vane for altering the direction of air flow in a duct, such as a wind tunnel, where the vane includes a device for attenuating sound propagation past the vane. The vane has extreme ends mounted to opposing sides of the duct, a longitudinal axis and an aerodynamically efficient profile. The vane comprises a rigid core having air permeable upper and lower surfaces, preferably a welded assembly of two perforated sheet metal plates with transverse profile plates, with vent holes, to provide the appropriate shape and venting. Two sound attenuating panels have interior surfaces bonded to the upper and lower core surfaces of the core, and exterior surfaces defining suction and pressure surfaces of the vane. Vent holes provide for passage of air axially within the core between the duct and the core surfaces. Venting is required to balance the air pressure on both sides of the sound attenuating panels to prevent distortion of the panels bonded to the core. Rippling and other distortions detrimentally effect the aerodynamic efficiency of the vane. To preserve the aerodynamic shape of the vane and structural integrity, a rigid nose fairing is mounted to a leading edge of the core, and a rigid tail fairing mounted to a trailing edge of the core. A protective layer on the exterior surfaces of the sound attenuating panels provides mechanical protection from air borne debris and contaminants. The protective layer is preferably a matte urethane film that is impervious to air for protection of the panels and is pervious to sound propagation between the duct and the sound attenuating panels to preserve the sound attenuating properties of the panels.

13 Claims, 4 Drawing Sheets

AERACOUSTIC WIND TUNNEL TURNING VANES

TECHNICAL FIELD

The invention is directed to aerodynamically efficient turning vanes for an aeroacoustic wind tunnel having a perforated sheet metal core covered with sound attenuating panels internally vented to equalize pressure between the interior of the turning vanes and the external air, nose and tail fairings which interface with the sound-attenuating material, and a non-permeable sound transparent protective coating.

BACKGROUND OF THE ART

A common method used to reduce sound levels in aeroacoustic wind tunnels is to apply sound-attenuating material to the wind tunnel turning vanes. The invention relates to a novel design of turning vanes that are treated with sound-attenuating material to efficiently turn a flow of air through a 90 degree angle, while simultaneously attenuating the propagation of sound past the turning vanes. The turning vanes are designed to be used in closed circuit wind tunnels that are intended for aeroacoustic measurements however, the turning vanes can be used in any closed ductwork used to move air, and in which reduction of acoustic noise is a concern.

The prior art includes various structures and duct treatments to reduce sound propagation. The application of acoustic treatment to the turning vanes of an aeroacoustic wind tunnel typically comprises one part of an overall acoustic treatment package. Turning vanes offer an especially effective location for acoustic treatment, due to reflections of sound waves from the turning vanes at the wind tunnel corners, and due to the possibility of multiple reflections of sound waves between adjacent turning vanes.

In particular, the set of turning vanes located just downstream of the test section, generally known as corner #1, can have a substantial effect on the wind tunnel test section background noise level, since this set of turning vanes has a direct line of sight to the test section.

The prior art designs for acoustically treated turning vanes have several disadvantages. Specifically, the aerodynamic efficiency has been less than optimal leading to energy loss and directly contributing to the cost of operating the wind tunnel.

Although acoustically treated turning vanes may impede the propagation of sound, due to relatively poor surface treatment, the passage of air flow over the turning vanes often produces significant self noise which diminishes the effectiveness of the overall wind tunnel acoustic treatment.

Also, the maintenance of vane shape and protection given to the physical integrity of prior art turning vanes are lacking. During starting or stopping of the wind tunnel, the corner sections where the turning vanes are located may undergo a pressure change of up to 30% of test section dynamic pressure. This change in pressure can cause physical distortion of the sound absorbing materials used in the turning vanes. Since such distortion may adversely affect the aerodynamic and/or acoustic performance of the turning vanes, failure to address these disadvantages leads to less than optimal performance of prior art designs.

Further, the wind tunnel air may be subject to varying levels of humidity, or may carry dirt, flow visualization smokes, or other contaminants which could clog the open cells of the sound absorbing materials covering the vanes leading to a decrease in sound absorption efficiency over time. Failure to protect the sound absorbing materials used in the turning vanes against contamination leads to increased maintenance, downtime and a gradual deterioration in performance over time.

Possibly the simplest prior art turning vane design applied a layer of sound absorbing material directly to one side of a standard set of circular arc, flat-plate turning vanes. One such design is described in the document by H. V. Fuchs, D. Eckoldt, U. Essers, and J. Potthoff, entitled "New Design Concepts for Silencing Aeroacoustic Wind Tunnels," AIAA Paper 93-02-029, presented at the DGLR/AIAA 14$^{th}$ Aeroacoustic Conference, 1992.

This prior art method is neither aerodynamically efficient, nor does it ensure smooth external shapes. Thick turning vanes composed of double circular arcs have also been used, however, this shape is also not very aerodynamically efficient. In general, previous designs have only incorporated sound absorbing material on one side of the turning vane. In no instances have prior art methods considered the need to compensate for pressure variations on the turning vanes during changes in wind tunnel operating conditions.

Such designs have also failed to fully appreciate the effect of surface treatments on self noise generation. For example, previous designs have utilized perforated sheet metal covers over the sound attenuating material, however such a surface generates significant noise under operating conditions in the air flow. Also the presence of sharp edges, gaps or steps in surfaces increases self noise generation.

Preferably turning vanes should be aerodynamically efficient in that they turn the air flow efficiently through the 90 degree change of direction while presenting minimum energy loss to the passing air. The aerodynamic efficiency of the turning vanes directly affects the power requirements of the wind tunnel main fan, and thus the operating cost of the wind tunnel.

For example, in the document by RD, Moore, D. R. Boldman, and R. J. Shyne, entitled "Experimental Evaluation of Two Turning Vane Designs for High Speed Corner of 0.1 Scale Model of NASA Lewis Research Center's Proposed Altitude Wind Tunnel," NASA TP 2570, 1986, (hereinafter "the NASA reference") a comparison was made between an aerodynamically efficient controlled diffusion airfoil shape profile and the standard prior art circular arc airfoil shape profile.

In this experiment, it was reported that significant changes in loss coefficient result from adoption of varying turning vane profile shapes. However, in this NASA study, no provision was made to attenuate sound propagation or self noise generation of the turning vanes.

Therefore the disadvantages of prior art turning vanes include: aerodynamically inefficient shape: failure to include sound attenuating material applied in a manner in which self noise generation is considered; failure to protect the sound absorbing material from contamination and physical damage; and failure to prevent shape distortion of the sound absorbing material under load conditions in the wind tunnel.

DISCLOSURE OF THE INVENTION

The invention provides an elongate turning vane for altering the direction of air flow in a duct, such as a wind tunnel, where the vane includes means for attenuating sound propagation past the vanes.

The wind tunnel usually includes a number of identical vanes spaced equally apart and arranged along a diagonal line bisecting the turning angle in the duct. Each vane has extreme ends mounted to opposing sides of the duct, a longitudinal axis and an aerodynamically efficient profile.

The vane comprises a rigid core having air permeable upper and lower surfaces, preferably a welded assembly of two perforated sheet metal plates with transverse profile plates, with vent holes, to provide the appropriate shape and venting.

Two sound attenuating panels are used to clad the core with interior surfaces of the panels bonded to the upper and lower core surfaces of the core, and exterior surfaces of the panels defining external suction and pressure surfaces of the vane.

Vent means provide for passage of air axially within the core between the duct and the core surfaces. Venting is required to balance the air pressure on both sides of the sound attenuating panels to prevent distortion of the panels.

To preserve the aerodynamic shape of the vane and structural integrity, a rigid nose fairing is mounted to a leading edge of the core, and a rigid tail fairing mounted to a trailing edge of the core.

A protective layer on the exterior surfaces of the sound attenuating panels provides mechanical protection from air borne debris and contaminants. The protective layer is preferably a matte urethane film that is impervious to air for protection of the panels and is pervious to sound propagation between the duct and the sound attenuating panels to preserve the sound attenuating properties of the panels.

Therefore the design of wind tunnel turning vanes according to the invention corrects the deficiencies of prior art designs by:

(1) using an aerodynamic profile to enhance operating efficiency by reducing energy loss;

(2) covering both the pressure surface and suction surface of the turning vane with sound absorbing material thereby improving the sound absorbing characteristics of the vanes;

(3) using rigid nose and tail fairings which maintain the aerodynamic profile of the vanes at the leading and trailing edges, and which smoothly overlap and retain the sound-absorbing material used in the main body of the turning vane;

(4) covering the exposed surfaces of the sound-absorbing material used in the vanes with a protective matte urethane film coating to prevent contamination while preserving the sound absorption characteristics; and (5) incorporating a venting system, which creates a flow path between the interior of the turning vanes and the external wind tunnel air to equalize pressure and prevent distortion of sound absorbing material on the vanes.

Further details of the invention and its advantages will be apparent from the detailed description and drawings included below.

BRIEF DESCRIPTION OF THE DRAWINGS

In order that the invention may be readily understood, a preferred embodiment of the invention will be described by way of example, with reference to the accompanying drawings wherein.

DETAILED DESCRIPTION OF PREFERRED EMBODIMENTS

Figure 1:
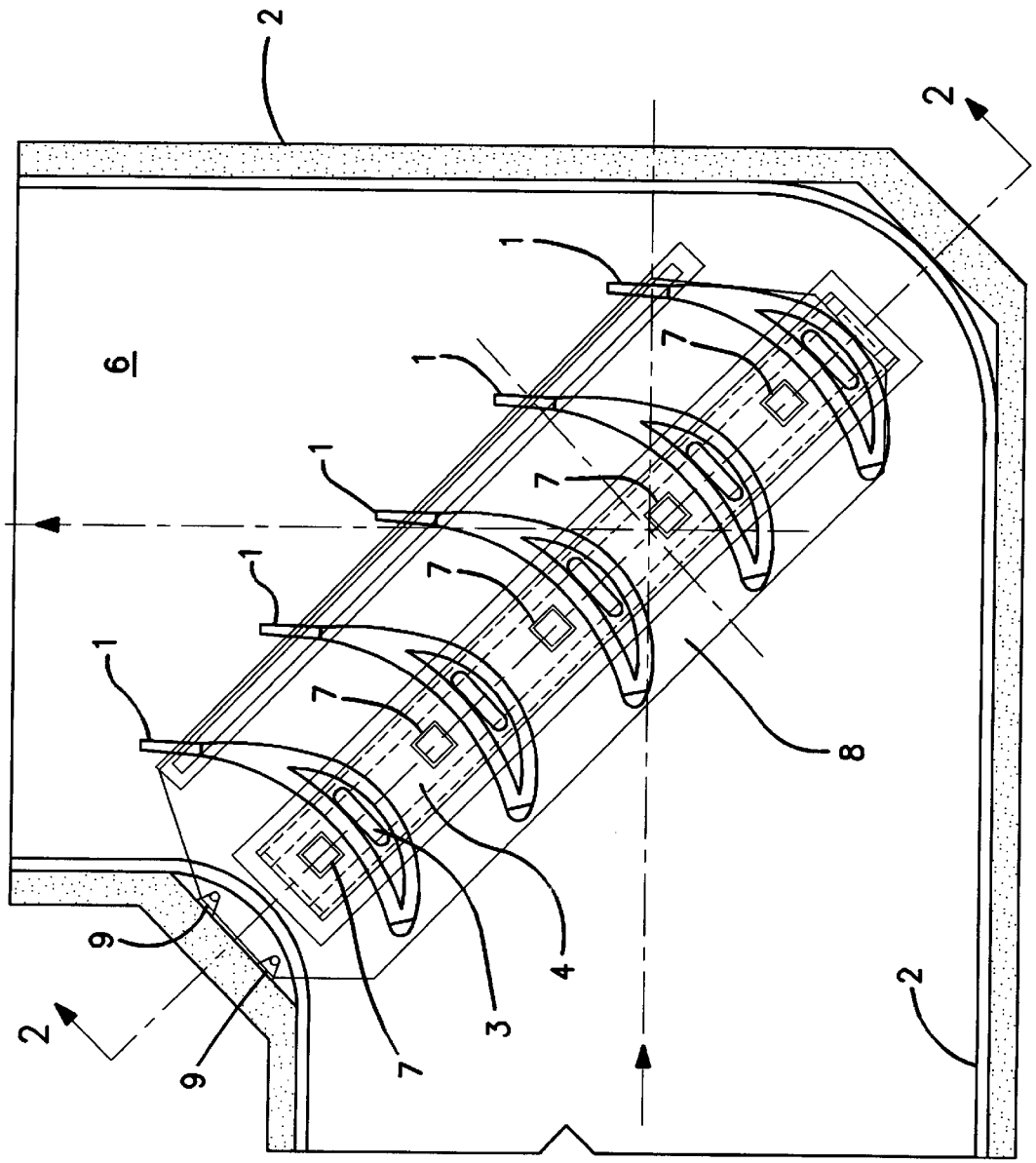
FIG. 1 is a plan sectional view through an assembly of five identical turning vanes disposed within a rectangular wind tunnel, with each vane positioned on the diagonal line bisecting the turning angle of the wind tunnel duct to direct air flow through a 90 degree change in direction.

With reference to FIG. 1, the following example relates to an assembly of five identical turning vanes disposed within a rectangular wind tunnel. It will be understood that vanes in accordance with the invention can be designed to accommodate the requirements of any wind tunnel. In the example of FIG. 1 each vane 1 is positioned on the diagonal line (i.e. line of section 2—2) bisecting the 90 degree turning angle of the wind tunnel duct 2 to direct air flow through a 90 degree change in direction as indicated by the arrows.

Figure 2:
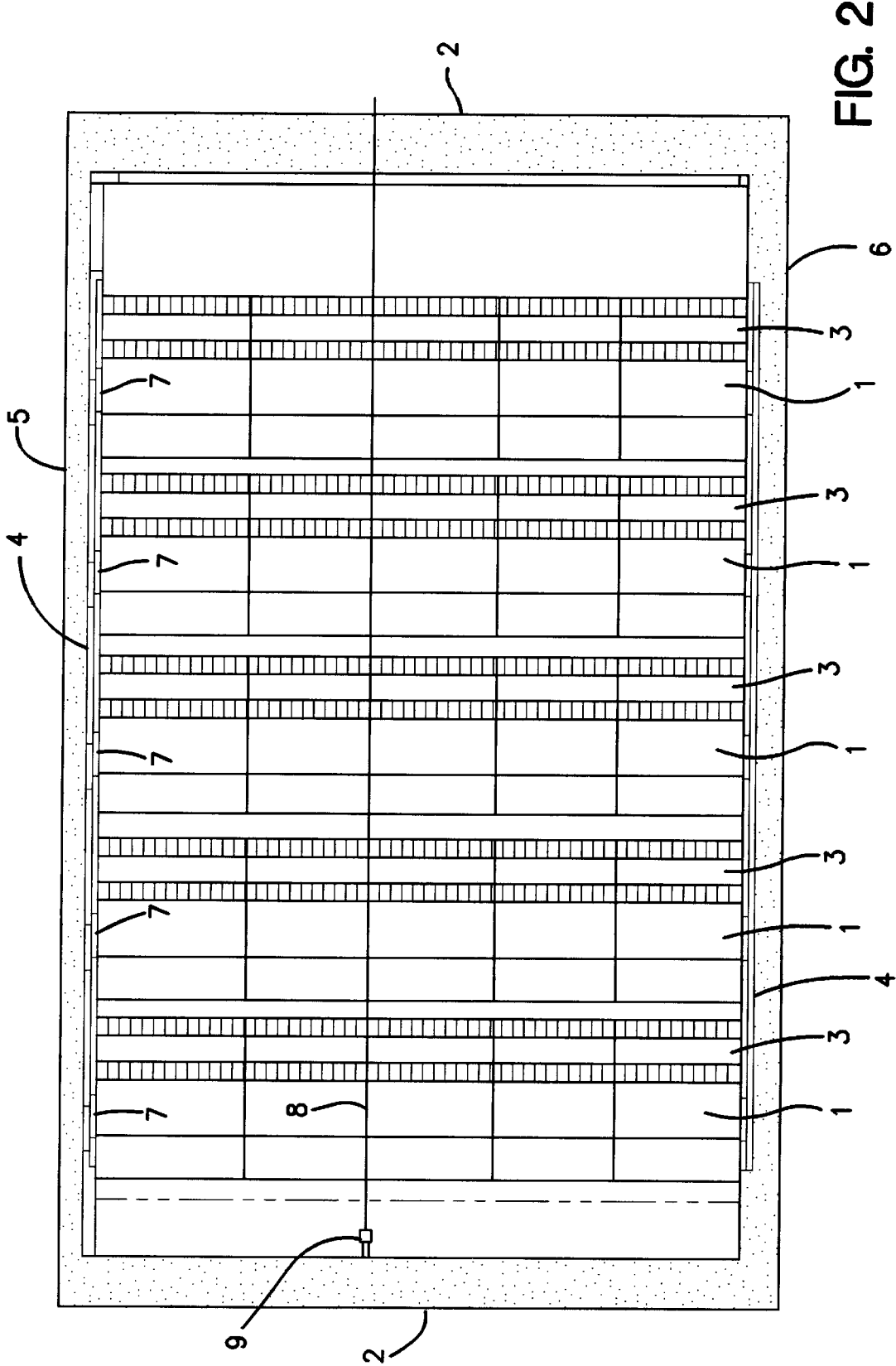
FIG. 2 is an elevation sectional view along line 2—2 of FIG. 1 showing the elongate vanes with hollow perforated core venting the core to a plenum at each end of the vane embedded in the wind tunnel ceiling and floor with vent ports to communicate between the core interior and the air within the duct.

FIG. 2 shows an elevation sectional view along line 2—2 of FIG. 1 showing the elongate vanes 1 with a perforated hollow core 3 venting the core 3 interior to a shallow plenum 4 at each end of the vane 1 embedded in the wind tunnel ceiling 5 and floor 6. Each plenum 4 includes vent ports 7 to communicate between the core 3 interior and the air within the wind tunnel duct 2. A flat splitter plate 8 is mounted with brackets 9 to an interior corner of the wind tunnel 2, and is connected to the core 3 of each vane 1 to provide lateral stability. Like features of the vanes 1, and plenum 4 are illustrated in plan view in FIG. 1.

Figure 3:
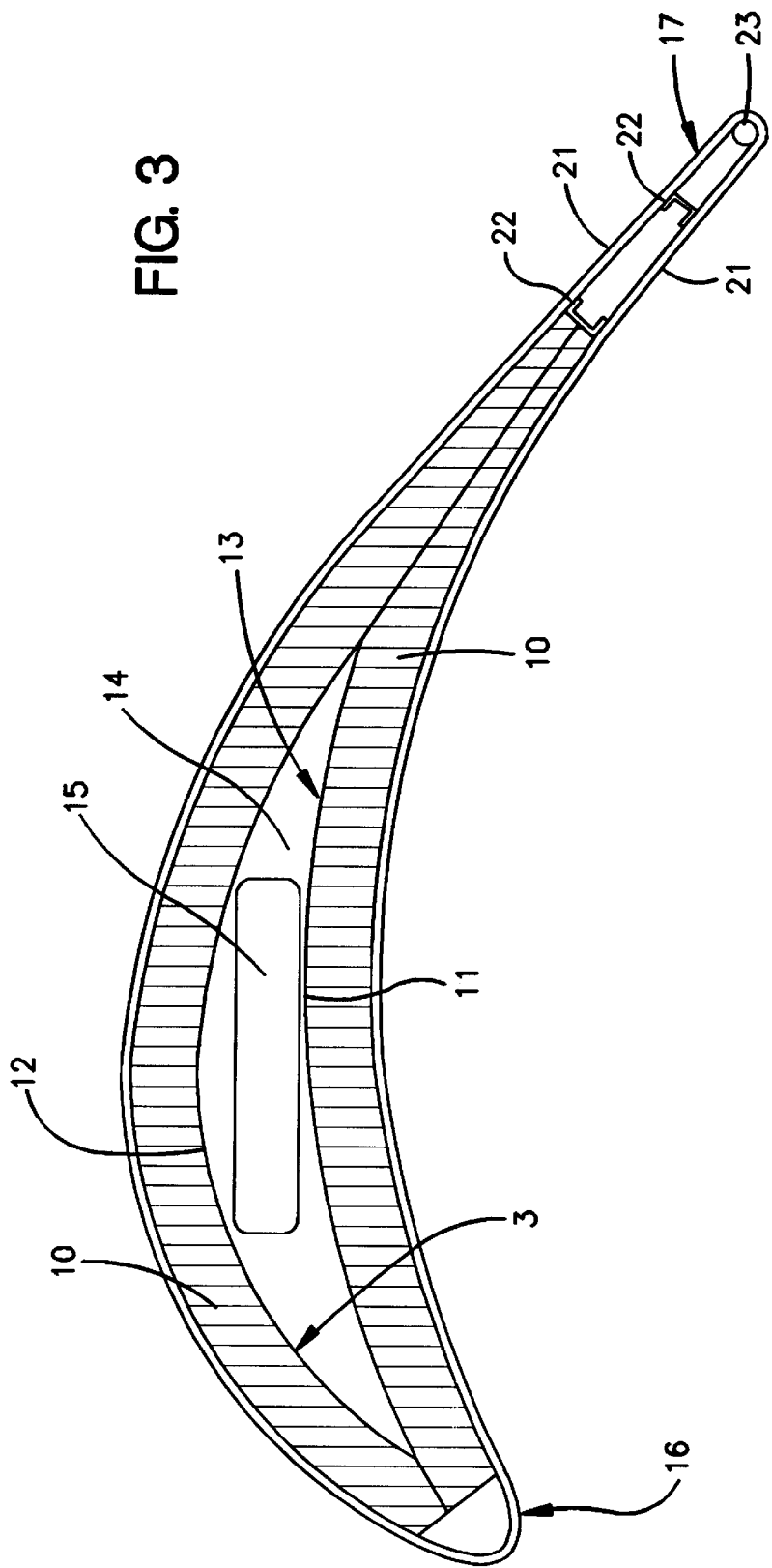
FIG. 3 is a detail plan sectional view like FIG. 1 to show the detailed construction of each vane.

FIG. 3 is a detail plan sectional view like FIG. 1 that shows the construction of each vane 1. In general, each identical turning vane 1 comprises sound absorbing foam panel panels 10 bonded with adhesive to an underlying perforated hollow core 3. The hollow core 3 is an assembly of perforated stainless steel plates 11, 12, that are formed in a smooth arc and welded together so as to create an internal cavity 13. The shape of the core 3 is maintained with transverse profile plates 14 having a central perforation or opening 15 to permit axial flow of air through the core 3.

The external controlled diffusion airfoil profile shape of the vane 1 was adopted from the NASA prior art described above, and was designed for minimum air resistance. For example, in the NASA reference the profile was shown to offer 20% less air resistance than the double circular-arc vane. The profile of the turning vanes 1 is defined by the external surface of the acoustic panels 10, except at the leading and trailing edges of the vanes 1, where nose 16 fairing and tail fairing 17 made of thin 1.5 mm. sheet metal are used. Coordinates for the upper and lower external surfaces of the sound-absorbing foam panel are included in Table 1 below to provide exact details of one embodiment as an example.

Figure 5:
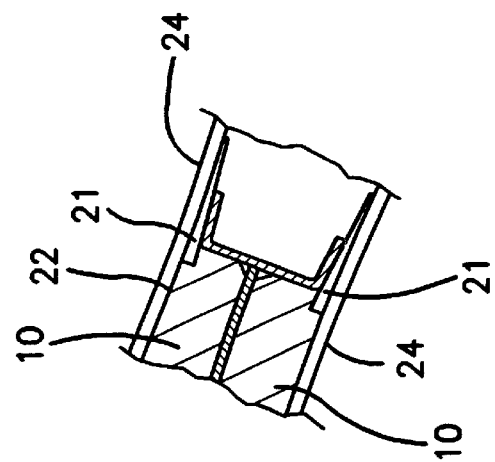
FIG. 5 is a detail of the tail fairing and attachment to the sheet metal plates of the core.
Figure 4:
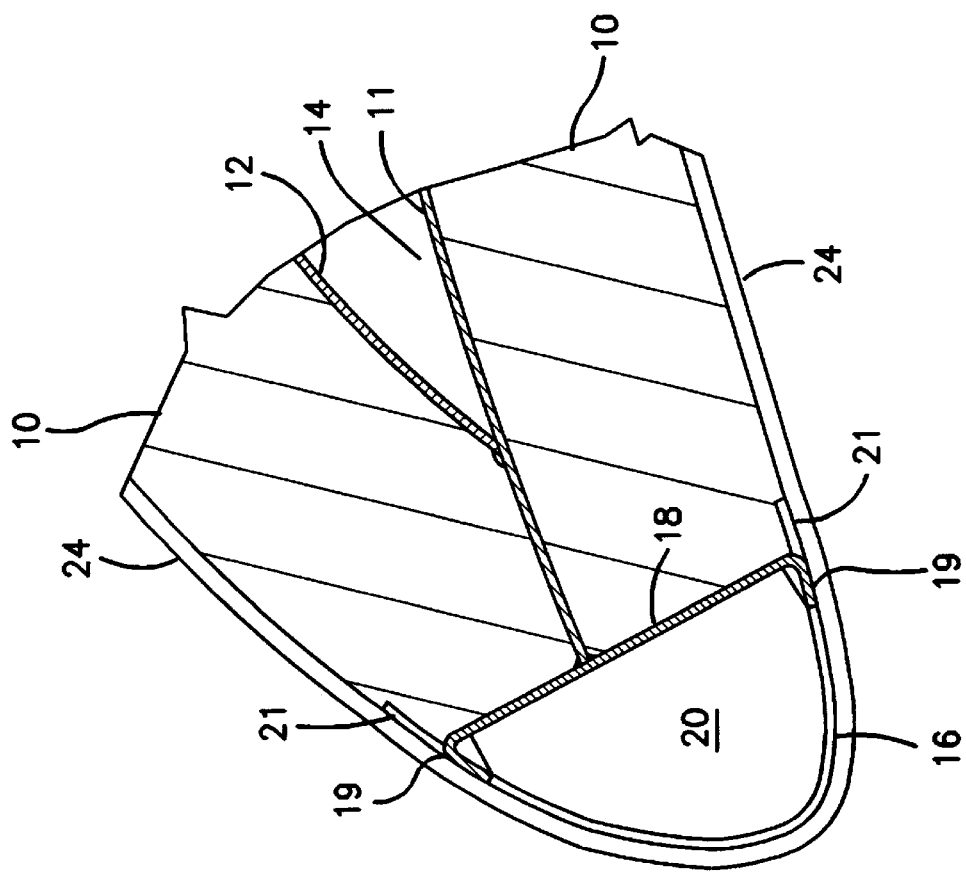
FIG. 4 is a detail of the nose fairing and attachment to the sheet metal plates of the core.

As shown in FIGS. 4–5, the core 3 includes supports for the nose fairing 16 and tail fairing 17, that are welded to the leading and trailing edges of the steel plates 11 and 12. A bent nose plate 18 is welded to the leading edge of the lower plate 11 of the core 3. At the junctions of upper plate 12 and lower plate 11 welded connections are also used. The bent plate 18 has an arcuate front wall 19 supported with transverse gusset plates 20 spaced axially apart which provides a rigid structure for the nose fairing 16. The nose fairing 16 is shaped according to the nose section of the turning vane 1 profile described in Table 1.

As seen in FIG. 5, the tail fairing 17 is constructed of tapering exterior tail plates 21 supported on interior channels 22. The tail fairing 17 is provided with a circular trailing edge supported by and wrapped about a steel rod 23.

The purpose of the fairings 16, 17 is to define the aerodynamic profile of the turning vanes 1 at the leading and trailing edges, where aerodynamic pressures may be sufficiently large to distort the less rigid, sound absorbing foam panel 10, or where it is too difficult to cut the sound-absorbing foam panel 10 in the required shape.

Details of the overlapping interface between the exterior plates 21 of the nose and tail fairings 16, 17 and the sound-absorbing foam panel 10 are shown in FIGS. 4–5. Both the nose and tail fairings 16, 17 overlap the adjacent sound-absorbing foam panels by 30 mm preferably. This overlap helps to retain the acoustic foam panel 10, and to ensure that there are no gaps or steps between the fairings 16, 17 and the foam panels 10 which may become sources of flow-induced noise.

In order to avoid altering of the acoustic properties of the sound-absorbing foam panels 10, and to maintain the aerodynamic profile of the turning vane 1, the sound-absorbing foam panel 10 should be installed on the upper and lower plate surfaces 12, 11 of the core 3 using the following guidelines.

In general, the sound-absorbing foam 10 takes the form of individual panels which are bonded to both sides of each turning vane. The foam panels 10 are pre-cut to fit the local profile of the turning vane 1 structure. The panels 10 are not bent to suit the turning vane profile, since this will result in surface wrinkles and non-uniformities that are aerodynamically and acoustically unacceptable. A cold mechanical cutting process should be used to cut the foam panel 10 to the required shape. A hot wire technique should not be used, since this process would locally melt the foam panel 10 and seal off the cells at the cut surface, adversely affecting the acoustic performance and the ability of the foam panel 10 to breathe. The open cell structure of the foam panel 10 is not altered by the cold mechanical cutting process.

The adhesive used to bond the acoustic foam panel 10 to the perforated sheet metal plates 11, 12 of the core 3 structure must be applied so that the perforations are not plugged with adhesive, and that the foam panel 10 is free to breathe through the perforations in the lower and upper core plates 11, 12 after the bonding process has been completed. The adhesive must be capable of resisting maximum pressure loads in the wind tunnel 2 corner.

As the final step in the installation of the acoustic panels 10, the leading edge nose and trailing edge tail fairings 16, 17 are installed. The nose and tail fairings 16, 17 are designed to overlap and slightly compress the vertical edges of the foam panels 10 at the leading and trailing ends of each turning vane 1. If, due to manufacturing tolerances, the adjacent vertical edges of each foam panel 10 are not compressed when the fairings 16, 17 have been installed, the foam panel 10 is either shimmed or caulking is applied to seal the vertical joint. To prevent flow generated self noise, the final external surface of the turning vane 1 must be relatively smooth, with tight vertical joints, and with surface steps that are no larger than the thickness of the fairing 16, 17 external metal sheet 21.

A matte urethane film coating 24 is applied to the exposed surfaces of the foam panel to provide a smooth, impervious, durable finish when installed in the wind tunnel 2. This surface film 24 is impermeable to air and particle penetration, capable of sustaining the maximum corner pressure loads without leakage, and provides mechanical protection for the foam panels 10. The surface film 24 eliminates any flow of air through the turning vane 1 surface thus improving the aerodynamic efficiency of the vane 1. Secondary flows, which would increase boundary layer growth and possibly cause stalling of the vane 1, are thus eliminated. The surface film 24 is required to achieve the best aerodynamic performance and to protect the foam panel 10, but the surface film 24 does not adversely affect the acoustic performance. This is achieved by applying the matte urethane film 24 with a spray technique that results in a very thin, limp film 24 bonded to the foam panel 10 surface, such that the film 24 is substantially transparent to sound over most of the frequency range.

The corners of the wind tunnel circuit 2 where the turning vanes 1 are located will see significant changes in static pressure during wind tunnel operation. It is essential that the foam panel insulation 10 is vented to allow the internal pressure of the foam panel 10 structure to equalize with the local air stream static pressure. The turning vane structure 1 has been designed with a venting system which will allow equalization of pressures to occur.

The vent path begins at venting ports 7 in two plenums 4 located in the floor 6 and ceiling 5 of the wind tunnel corner. The vent ports 7 are provided in the spaces between the turning vanes 1 and allow communication with the air of the duct. The plenums 4 communicate with the interior hollow core 3 of each turning vane 1, and then through perforations in the core sheet steel plates 11, 12 to the inside of the foam panel panels 10.

FIG. 1 shows an arrangement of turning vanes 1 in the corner of an aeroacoustic wind tunnel 2. The turning vanes 1 are spaced regularly along the diagonal of the corner, at intervals determined for maximum aerodynamic efficiency. The chord angle of attack of the turning vanes 1 is 55 degrees as recommended in the NASA reference. Vent ports 7 are located in the gaps between the tuning vanes 1. The vent ports 7 are covered with a perforated metal cover that prevents debris that may be carried with the external flow from entering and possibly blocking the venting path.

To summarize therefore, the invention provides an elongate turning vane 1 for altering the direction of air flow in a duct, such as a wind tunnel 2. The vane 1 has ends mounted to opposing ceiling 5 and floor 6 of the wind tunnel duct 2. The vane 1 has a longitudinal axis and an aerodynamically efficient profile.

The vane 1 includes a rigid core 3 having air permeable upper and lower plate surfaces 11, 12. The vane 1 includes vent means for passage of air axially within the core 3 between the duct 2 and the perforated core surfaces 11, 12. In the example illustrated, the core 3 is hollow, however, other vent means are within the contemplation of the invention.

Two sound attenuating panels 10 are provided with interior surfaces bonded to the upper and lower core plate surfaces 11, 12. The exterior surfaces of the panels 10 define suction and pressure profile surfaces of the vane 1.

A rigid nose fairing 16 is mounted to a leading edge of the core 3 and a rigid tail fairing 17 is mounted to a trailing edge of the core 3. A protective layer 24 on the exterior surfaces of the sound attenuating panels 10 is impervious to air and pervious to sound propagation between the duct 2 and sound attenuating panels 10.

The preferred structure includes a core 3 which comprises a hollow tube of perforated sheet metal. As shown in FIGS. 3–5 the hollow core 3 can be easily constructed as an assembly of two smoothly arcuate sheets 11, 12 having differing curvature. Transverse perforated profile plates 14 connect to both upper 12 and lower 11 sheets and are spaced axially apart to support the sheets 11, 12 and maintain the profile.

Nose and tail fairing 16, 17 comprise sheet metal subassemblies mounted to the core 3 sheets 11, 12. The fairings 16, 17 overlap and retain an adjacent edge of sound attenuating panels 10.

Although the above description and accompanying drawings relate to a specific preferred embodiment as presently contemplated by the inventors, it will be understood that the invention in its broad aspect includes mechanical and functional equivalents of the elements described and illustrated.

The embodiments of the invention in which an exclusive property or privilege is claimed are defined as follows:

1. An elongate turning vane for altering the direction of air flow in a duct, the vane having ends mounted to opposing sides of the duct, the vane having a longitudinal axis and an aerodynamically efficient profile, the vane comprising:

a rigid core having air permeable upper and lower surfaces;

vent means for passage of air axially within the core between the duct and said core surfaces;

two sound attenuating panels with interior surfaces bonded to the upper and lower core surfaces, and exterior surfaces defining suction and pressure surfaces of the vane;

a rigid nose fairing mounted to a leading edge of the core;

a rigid tail fairing mounted to a trailing edge of the core; and a protective layer on the exterior surfaces of the sound attenuating panels, the protective layer being impervious to air and pervious to sound propagation between the duct and sound attenuating panels.

2. A vane according to claim 1 wherein the vent means further comprise a plenum disposed in a side of the duct and in communication with the core and with the duct.

3. A vane according to claim 2 wherein the vent means comprise a said plenum in each said opposing side of the duct.

4. A vane according to claim 3, wherein each plenum includes a vent port in communication with the duct.

5. A vane according to claim 1 wherein the core comprises a hollow tube of perforated sheet metal.

6. A vane according to claim 5 wherein the core comprises an assembly of two sheets having differing curvature.

7. A vane according to claim 6 wherein the core includes transverse perforated profile plates connected to both sheets and spaced axially apart.

8. A vane according to claim 1 wherein the nose and tail fairing comprises sheet metal.

9. A vane according to claim 8 wherein the fairings overlap an adjacent edge of sound attenuating panels.

10. A vane according to claim 1 wherein the sound attenuating panels comprise open cell foam.

11. A vane according to claim 10 wherein the foam panel is bonded to the core with adhesive.

12. A vane according to claim 1 wherein the protective coating comprises a matte urethane film.

13. A vane according to claim 1 including a splitter plate laterally connecting the vane to an adjacent wall of the duct.

* * * * *